United States Patent Office 3,022,170
Patented Feb. 20, 1962

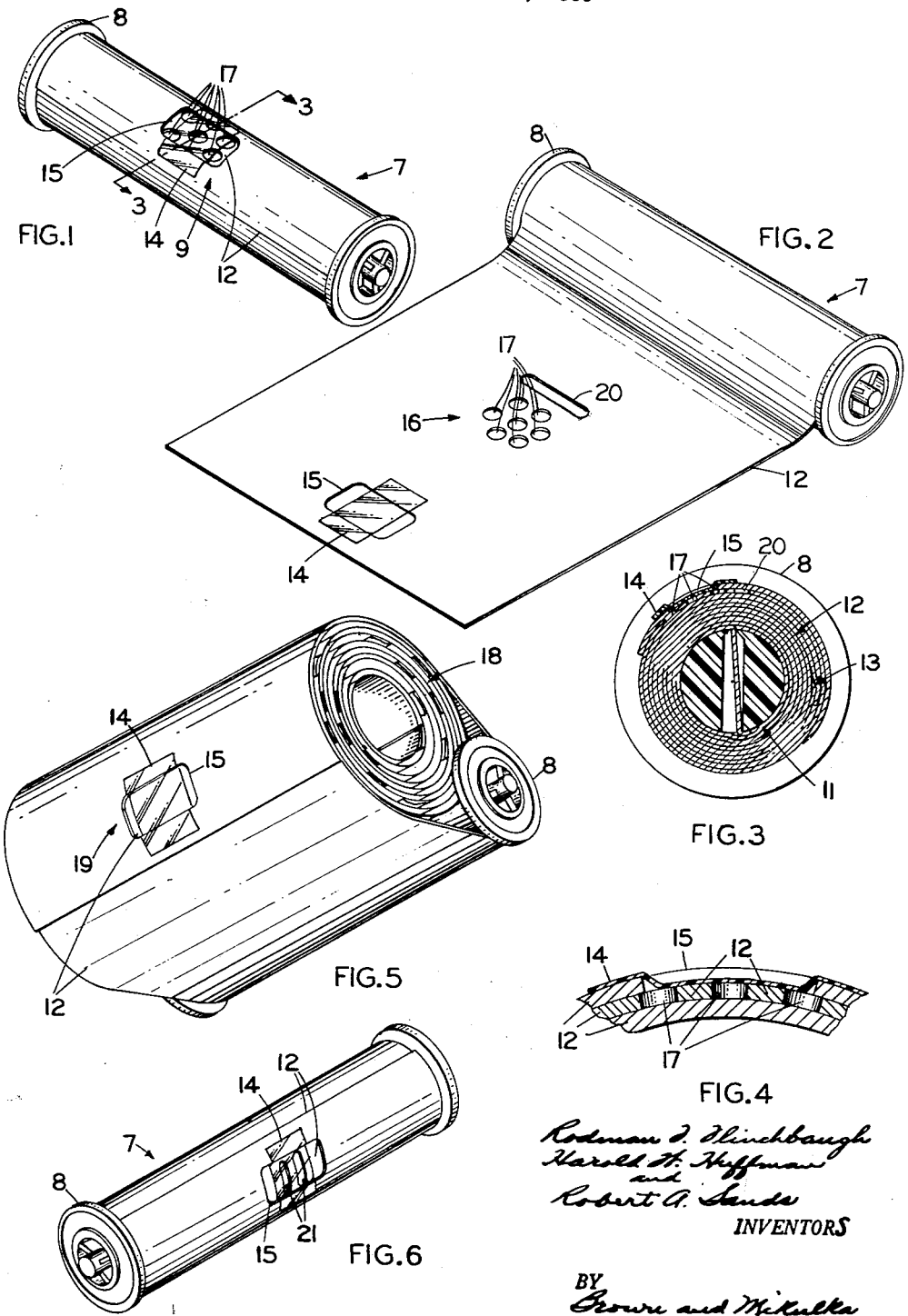

3,022,170
TEMPORARY SEAL FOR PHOTOGRAPHIC
FILM ROLL
Rodman F. Flinchbaugh, Natick, Mass., Harold W. Huffman, Fairfield, Ohio, and Robert A. Sands, Winchester, Mass., assignors to Polaroid Corporation, Cambridge, Mass., a corporation of Delaware
Filed Dec. 29, 1959, Ser. No. 862,555
4 Claims. (Cl. 96—78)

This invention relates to an improved temporary seal for photographic film rolls and has for its object the provision of such a seal that can be broken after sealing and then effectively reused again.

Sealed photographic film rolls of the type shown in Wolff Patent No. 2,630,385 comprise a composite assembly of two rolls of photographic sheet material together with a suitable developing material which are adapted for use in cameras of the type shown in Carbone et al., Patent No. 2,455,111. One of the rolls of such composite assembly comprises a photosensitive strip which is initially wound on a spool in a dark room during which an opaque paper leader is attached to its outer end portion and wrapped completely around the photosensitive strip to protect it from actinic radiation during subsequent handling of the photosensitive roll outside of the dark room. A temporary seal is affixed to the outer end portion of the leader to keep the finished roll tightly wound, and, as shown in the Wolff patent, such a temporary seal may comprise a strip of pressure-sensitive adhesive material secured to the outer end portion of the paper leader, there being a window formed in the leader underneath a part of the pressure-sensitive tape so that the tape can be pressed through the window and secured to the outer surface of the next inner layer of the leader to keep the roll tightly wound.

A second similar temporary seal is also affixed to the leader near its inner end where it joins the photosensitive sheet material to prevent the leader from being unrolled during handling beyond the second seal. As is clearly pointed out in the Wolff patent, this second or inner seal is readily broken when a composite film is inserted in a camera and processed therethrough in a sequential manner. Additionally, the first or outer temporary seal is readily broken to permit unrolling of the leader to the second seal and insertion and attachment of the second roll of photographic sheet material.

It has been found that this type of seal, once broken, is many times not usable again when the leader is rolled up over both rolls to form the composite film roll.

Despite the fact that the leader has a somewhat calendered outer surface, the pressure-sensitive adhesive tape, when pulled away from this somewhat calendered surface, often brings with it most of the surface material, leaving little if any of the adhesive coating exposed and thus available for subsequent resealing of the composite film roll. Sometimes the tape sticks and sometimes it does not, requiring continuous checking of the outer seal during final assembly and in many instances the application of a second strip of pressure-sensitive adhesive material to the composite film roll to insure effective retention of the leader to its next inner layer.

To overcome this problem a second window is formed in the leader and arranged to underlie the first window when the first roll is wound up in the dark room, the second window being smaller than the first window to allow a part only of the pressure-sensitive tape pressed through the first window to contact and adhere to the outer surface of the layer of leader underneath the first window. That part of the tape which overlies the second window does not contact the surface of the leader and is thus unused during the initial sealing of the roll of photosensitive strip material. When the second roll of photographic sheet material is subsequently attached to the first roll, the outer seal is broken and the leader is unwound for a portion of its length to allow insertion of the second roll after which the leader is again wrapped up around the two rolls. The unused portion of the pressure-sensitive tape contacts a fresh surface of the leader and positively sticks to it and thus retains the two rolls in their compact assembled form. No further check of the outer seal is necessary nor is it necessary to add additional strips of pressure-sensitive adhesive material.

The invention accordingly comprises the product possessing the construction, combination of elements and arrangement of parts which are discussed above and exemplified in the following detailed disclosure, and the scope of the application of which will be indicated in the claims.

For a fuller understanding of the nature and the objects of the invention reference should be had to the following detailed description taken in connection with the accompanying drawing wherein:

FIGURE 1 is a perspective view of a roll of photosensitive sheet material after it has been initially wound in a dark room with its temporary outer seal in place;

FIG. 2 is a view similar to FIG. 1 but showing the temporary outer seal broken and a portion of the leader unrolled;

FIG. 3 is a sectional view taken along the lines 3—3 of FIG. 1;

FIG. 4 is an enlarged, fragmentary, sectional view of the outer temporary seal;

FIG. 5 shows a composite film roll which includes the roll shown in FIG. 1 and a second roll of photographic sheet material; and FIG. 6 is a view similar to FIG. 1 showing another form of the invention.

Referring now to the drawing there is shown in FIGURE 1 a roll 7 of photographic sheet material tightly wound on a molded plastic spool 8 and retained in this condition by the temporary outer seal 9 which forms the subject of the present invention. The photographic sheet material may comprise an inner strip of photosensitive sheet material 11 wound on the innermost portion of the spool to which is affixed at its outer end an outer opaque paper leader 12 which, when wound up with the photosensitive strip, adds a plurality of protective layers around the strip and provides the necessary length of leader material for accommodating a second roll of photographic sheet material 18 to form therewith a composite film roll of the type shown in the aforesaid Wolff patent. The leader affixed to the photosensitive strip is also useful in the manipulation of the film roll through a camera as pointed out in the Wolff patent and as further delineated in the aforesaid Carbone et al. patent.

FIG. 3 shows at 13 the junction between the inner photosensitive strip and outer paper leader, it being understood, although not shown, that a second inner temporary seal of the type shown in the Wolff patent is used to retain the inner photosensitive strip in wound form when the outer paper leader is unrolled for subsequent use and manipulation of roll 7.

The improved temporary seal comprises a strip of pressure-sensitive adhesive material 14 secured to the outer surface of the outer end portion of leader 12. Underneath a part of strip 14 is a first enlarged window 15 formed in the leader by removing a portion thereof. Spaced inwardly along the leader there is a second window 16 again formed by removal of portions of leader 12. As is shown in the drawing, the second window in this form of the invention comprises a plurality of circular apertures 17 formed in leader 12. The combined area of the second window is substantially less than the area of window 15 which underlies tape 14, and the second window is spaced a sufficient distance along the leader 12 so as to underlie the first window when the roll 7 is initially formed in a dark room and temporarily sealed.

As is best shown in FIG. 4, the tape 14 is pressed through window 15 and a portion of the adhesive surface of the tape contacts portions of the outer surface of the next inner layer of leader 12 and adheres thereto to seal the outer end portion of the leader in place. However, portions of that part of tape 14 which is pressed through window 15 overlie the apertures 17 and are thus unused when the temporary seal 9 is first applied. Such portions overlying windows 17 aggregate a substantial area of adhesive surface which remains fresh and uncovered for subsequent use.

Even though the outer surface of paper leader 12 may be somewhat calendered, it has been found with most commercially available pressure-sensitive adhesive tapes that most if not all of the surface material adheres to the contacting adhesive surface when the seal 9 is broken. With such surface material adhering to the adhesive surface, it is apparent that this portion of the tape is unsuitable for any subsequent use. However, with a substantial area of adhesive surface not contacting the outer surface of leader 12 when the leader is first sealed, breaking the seal will have no effect on this portion of the adhesive surface and it will be available, fresh and uncontaminated with surface material, for subsequent sealing.

When unrolling leader 12 after temporary seal 9 has been broken, there may be a tendency for the surface material of the leader to peel off along the leader from the edges of apertures 17. An opening in the leader in the form of transverse slot 20 adjacent to apertures 17 will prevent any stripping from continuing beyond this opening.

When it is desired to make up a composite film roll the temporary seal 9 is broken and the leader 12 is unwound for a suitable length after which the second roll of photographic sheet material 18 may be placed on the leader with its outer end affixed thereto. Such second roll of photographic sheet material includes a plurality of rupturable containers which releasably confine a suitable developing material which co-acts with the two rolls in the manner described in the aforesaid Wolff and Carbone et al. patents to produce photographic prints.

When the second roll 18 is properly affixed to the leader 12 the leader is then wrapped around both rolls to form a composite film roll which is then again sealed by means of the tape 14. With the roll 18 in place, it is obvious that the tape 14 will overlie a different section of the leader 12 and since a substantial portion of the adhesive surface of the tape has been preserved during initial sealing of roll 7, this unused portion of the tape 14 will contact and adhere to the surface of leader 12 which underlies it and provide an effective, positive seal for the composite film roll, such new seal being generally indicated at 19 in FIG. 5.

When the composite film roll is to be used in a camera the new seal 19 is readily broken to permit placement of the rolls 7 and 18 and threading of the leader 12 through the camera.

An alternate form of the invention is shown in FIG. 6 wherein the second window 16 is formed by a pair of elongated slots 21, in place of the apertures 17 shown in FIGS. 1 to 4. Again, with the construction of FIG. 6, the combined area of the slots 21 is substantially less than the area of window 15 which underlies tape 14 so that a substantial area of the adhesive coating on tape 14 is unused during initial sealing of roll 7. Also, a transverse slot similar to slot 20 is formed adjacent elongated slots 21 to prevent undesirable stripping of the surface material of the leader when the temporary seal is broken.

It is to be noted in both forms of the invention that window 16 provides a substantial opening on both sides of tape 14, which arrangement facilitates pressing the tape through the window and adherence of the adhesive coating to the outer surface of the next inner layer of the leader.

It has been found that the following dimensions provide effective temporary seals in each embodiment of the invention, the "widths" designating the dimension taken transversely of leader 12 and the "lengths" designating the dimension taken perpendicularly to the "widths," along the direction of elongation of the leader. Thus, opening 15 may be ⅝-inch wide and ⅜-inch long with the tape 14 being only ½-inch wide and about ⅝-inch long. Openings 17 are ⅛-inch in diameter, arranged in an array of one center opening with six surrounding openings spaced 60° apart, with their centers lying on a circle having a diameter of about 7/16-inch. The center-to-center distance between openings 15 and 17 is 2¾ inches.

Slots 21 may be about 3/32-inch wide and ½-inch long, with their center-to-center spacing being about 7/32-inch. The centers of slots 21 are about 2¾ inches from the center of opening 15.

Slot 20 for either embodiment is about ⅝-inch wide and 3/32-inch long, spaced about ⅛-inch from either the circular openings 17 or the elongated slots 21.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. In a photographic film roll, the combination therewith of a temporary, reusable adhesive seal, comprising a piece of pressure-sensitive adhesive tape secured to the outer layer of said film roll and adhesively engaging the next inner layer of said film roll through a first window in said outer layer, said next inner layer having a second window underlying said first window, said first window being formed by removing a portion of said outer layer and said second window being formed by removing portions of said next inner layer to form a plurality of openings therein, the combined area of said plurality of openings being less than that of said first window.

2. The invention defined by claim 1 wherein said plurality of openings comprise an array of closely spaced circular apertures.

3. The invention as defined by claim 1 wherein said plurality of openings comprise an array of closely spaced elongated slots.

4. The invention defined by claim 1 wherein a third opening spaced inwardly along said next inner layer extends transversely of said plurality of openings and in the path of any surface material which tends to strip away from said plurality of openings toward said third opening.

References Cited in the file of this patent

UNITED STATES PATENTS

| | | |
|---|---|---|
| 2,188,779 | Roehrl | Jan. 30, 1940 |
| 2,630,385 | Wolff | Mar. 3, 1953 |